United States Patent [19]
Noguchi

[11] Patent Number: 5,220,443
[45] Date of Patent: Jun. 15, 1993

[54] MATRIX WIRING SUBSTRATE AND ACTIVE MATRIX DISPLAY HAVING NON-LINEAR RESISTANCE ELEMENTS FOR ELECTROSTATIC DISCHARGE PROTECTION

[75] Inventor: Kesao Noguchi, Tokyo, Japan

[73] Assignee: NEC Corporation, Tokyo, Japan

[21] Appl. No.: 694,347

[22] Filed: Apr. 29, 1991

[51] Int. Cl.$^5$ .................... G02F 1/136; H01L 29/78; H01L 45/00
[52] U.S. Cl. ........................... 359/59; 359/60; 359/54; 359/87; 257/328; 257/356; 257/546
[58] Field of Search .................... 359/58–60; 357/23.7, 23.13, 45; 340/784; 361/58, 91

[56] References Cited

U.S. PATENT DOCUMENTS

| | | | |
|---|---|---|---|
| 4,413,883 | 11/1983 | Baraff et al. | 359/58 |
| 4,731,610 | 3/1988 | Baron et al. | 359/748 |
| 4,789,857 | 12/1988 | Maurice | 340/784 |
| 4,803,536 | 2/1989 | Tuan | 357/23.13 |
| 4,820,222 | 4/1989 | Holmberg et al. | 340/784 |
| 5,019,002 | 5/1991 | Holmberg | 357/23.13 |
| 5,068,748 | 11/1991 | Ukai et al. | 359/59 |

FOREIGN PATENT DOCUMENTS

| | | | |
|---|---|---|---|
| 0182645 | 5/1986 | European Pat. Off. | 359/59 |
| 0292113 | 11/1988 | Japan | 359/58 |
| 0052128 | 2/1989 | Japan | 359/60 |
| 0136125 | 5/1989 | Japan | 359/59 |
| 0118617 | 5/1990 | Japan | 340/784 |
| 2146827 | 4/1985 | United Kingdom | 340/784 |

Primary Examiner—William L. Sikes
Assistant Examiner—Tai V. Duong
Attorney, Agent, or Firm—Laff, Whitesel, Conte & Saret

[57] ABSTRACT

A matrix wiring substrate comprises a plurality of first level wirings provided on an insulating substrate, a plurality of second level wirings provided on the insulating substrate to intersect the first level wirings, and an insulating layer provided between the first and second level wirings so as to electrically separate the first and second level wirings from each other. A common electrode is connected in common to the first and second level wirings for prevention of an electrostatic destruction of the insulating layer. A non-linear resistance element is connected between each of the first and second level wirings and the common electrode. The non-linear resistance element has a resistance non-linearly decreasing with increase of a voltage applied across the non-linear resistance element.

12 Claims, 13 Drawing Sheets

MATRIX WIRING SUBSTRATE AND ACTIVE MATRIX DISPLAY HAVING NON-LINEAR RESISTANCE ELEMENTS FOR ELECTROSTATIC DISCHARGE PROTECTION

BACKGROUND OF THE INVENTION

1. Field of the Invention

The present invention relates to a matrix wiring substrate used as for example a drive electrode assembly of an active matrix liquid crystal display, and more specifically to a matrix wiring substrate having a common electrode for preventing an electrostatic breakdown or destruction in a manufacturing process.

2. Description of Related Art

In the prior art, this type of matrix wiring substrate has been constructed by stacking on a substrate a lower level wiring and an upper level wiring, interposing therebetween an insulating layer or a combination of an insulating layer and a semiconductor layer. In this structure, the insulating layer is apt to be broken down or destroyed by static electricity, so that the lower level wiring and the upper level wiring are short-circuited. Therefore, various countermeasures have been proposed in order to prevent the electrostatic breakdown or destruction.

Referring to FIG. 1, there is shown a circuit diagram of one typical conventional matrix wiring substrate provided with the means for preventing the electrostatic destruction. The shown example is a matrix wiring substrate of a TFT (thin film transistor) active matrix liquid crystal display.

A number of pixel electrodes 1 corresponding to pixels of the liquid crystal display and each associated with one TFT 2 for individually driving the corresponding pixel electrode 1 are arranged on a glass substrate 1 in the form of a matrix. The TFTs 2 are formed of amorphous silicon (a-Si). Gates of all the TFTs 2 included in each one row are connected to a corresponding gate bus line 3 extending in an X direction, and drains of all the TFTs 2 included in each one column are connected to a corresponding drain bus line 4 extending in a Y direction. Each of the gate bus lines 2 is connected at its one end to a gate terminal 5, and at its other end to a checking pad 6. In addition, each of the drain bus line 4 is connected at its one end to a drain terminal 7, and at its other end to a checking pad 8.

For example, the gate bus lines 3 are formed from a lower level wiring, and the drain bus line 4 are formed from a upper level wiring. Therefore, crossing points P between the gate bus lines 3 and the drain bus line 4 occurs in the same number as the number of the pixels 1. In addition, the TFTs 2 provided one for each of the pixels 1 have a gate insulator sandwiched between the upper level wiring and the lower level wiring, similarly to a MOS transistor.

With the above mentioned arrangement, the crossing points P between the upper and lower level wirings and the TFTs 2 are liable to be electrostatically broken in a manufacturing process. This has become one of causes of lowering a yield of production.

In order to prevent the electrostatic breakdown or destruction, common electrodes 9 formed from a lower level wiring are provided at an outside of the gate terminals 5 and the checking electrodes, and common electrodes 10 formed from a upper level wiring are provided at an outside of the drain terminals 7 and the checking electrodes 8, and these common electrodes 9 and 10 are interconnected at four corners by means of through-hole contacts 11. The gate terminals 5 and the drain terminals 7 are connected to the common electrodes 9 and 10, respectively. With this arrangement, the upper and lower level wirings are maintained at an equal potential, so that occurrence of the electrostatic breakdown or destruction can be effectively prevented.

Incidentally, at a late stage of the manufacturing process, the common electrodes 9 and 10 are cut away by cutting along an imaginary line which connects cut marks 12.

For example, in the liquid crystal display, it is necessary to provide the upper level wirings and the lower level wirings respectively in the number corresponding to a horizontal pixel number determining a horizontal resolution of an image and in the number corresponding to a vertical pixel number determining a vertical resolution of the image. As a result, the number of the wirings exceed 1000. Therefore, from a viewpoint of product control, it is necessary to sufficiently perform a good/defective checking of wirings in the course of the manufacturing process.

In the above mentioned conventional matrix wiring substrate, however, since all the wirings are shunted to the common electrodes for prevention of the electrostatic breakdown or destruction, a sufficient checking sensibility could not have been obtained in a wiring checking (I-V checking) for discriminating the quality of the wirings. As a result, the checking has been very difficult.

SUMMARY OF THE INVENTION

Accordingly, it is an object of the present invention to provide a matrix wiring substrate which has overcome the above mentioned defect of the conventional one.

Another object of the present invention is to provide a matrix wiring substrate capable of effectively preventing the electrostatic breakdown or destruction and capable of allowing to easily execute the wiring checking.

The above and other objects of the present invention are achieved in accordance with the present invention by a matrix wiring substrate comprising an insulating substrate, a plurality of first level wirings provided on the insulating substrate, a plurality of second level wirings provided on the insulating substrate to intersect the first level wirings, an insulating layer provided between the first and second level wirings at least at a region where the first and second level wirings intersect each other, a common electrode connected in common to the first and second level wirings for prevention of an electrostatic destruction of the insulating layer, and a non-linear resistance element connected between each of the first and second level wirings and the common electrode, the non-linear resistance element having a resistance non-linearly decreasing with increase of an absolute value of a voltage applied across the non-linear resistance element.

With the above mentioned arrangement, the non-linear resistance element connected between each of the first and second level wirings and the common electrode acts as a low resistance element when a large voltage is applied across the non-linear resistance element, and as a high resistance element when a low voltage is applied across the non-linear resistance element for the purpose of the wiring checking. As a result, when static electricity is applied, since the non-linear resistance element acts as a low resistance element, an electric current flows through the non-linear resistance element and the common electrode, so that the insulating layer between the first and second level wirings is protected from an electrostatic breakdown or destruction. On the other hand, when a low checking voltage is applied at the time of the wiring checking, since the non-linear resistance element has a resistance greatly larger than a resistance of a non-defective wiring, the checking of the individual wirings can be easily carried out.

In addition, the non-linear resistance element can be connected not only between the common electrode and each of the wirings, but also between each pair of adjacent wirings. In this case, all the wirings are connected to form a loop through the intermediary of the non-linear resistance elements. Therefore, even after the common electrodes are cut away, a current path for discharging an electrostatic charge is ensured so that the electrostatic breakdown or destruction can be effectively prevented.

According to another aspect of the present invention, there is provided an active matrix liquid crystal display comprising an insulating substrate, a number of pixel electrodes arranged in the form of a matrix on the insulating substrate, each of the pixel electrodes being associated with one switching means for individually driving the corresponding pixel electrode, a plurality of row lines formed from a first level conductor on the insulating substrate and each extending along a corresponding row of the matrix, the switching means included in each one row being connected to a corresponding row line, a plurality of column lines formed from a second level conductor on the insulating substrate and each extending along a corresponding column of the matrix and intersecting the plurality of row lines, the switching means included in each one column being connected to a corresponding column line, an insulating layer provided between the first and second level conductors for insulating the first and second level conductors from each other, a common electrode connected in common to the row lines and the column lines for prevention of an electrostatic destruction of the insulating layer, and a non-linear resistance means connected between the common electrode and each of the row lines and the column lines, the non-linear resistance means having a resistance non-linearly decreasing with increase in an absolute value of a voltage applied across the non-linear resistance means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
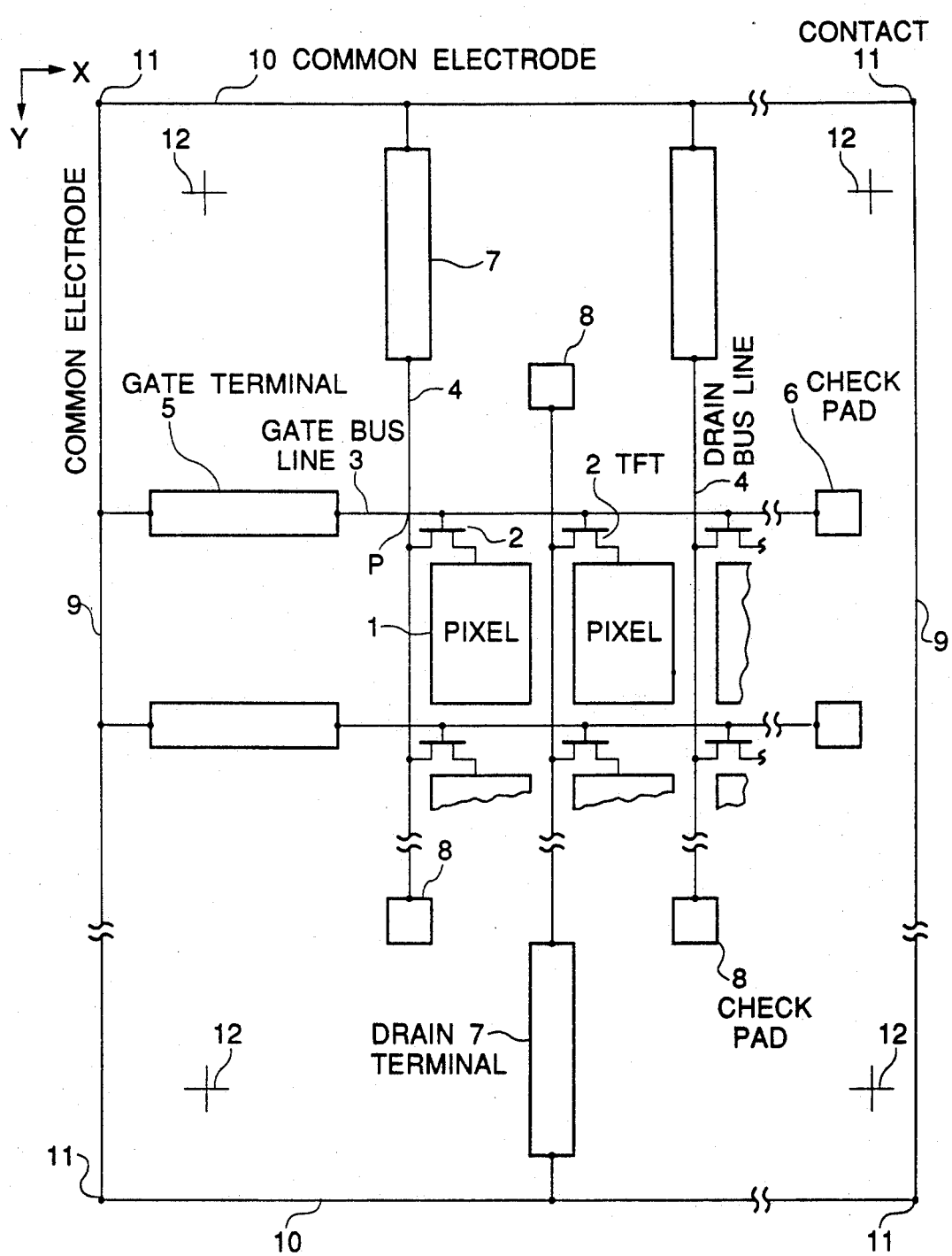
FIG. 1 is a circuit diagram of one conventional matrix wiring substrate.
Figure 2:
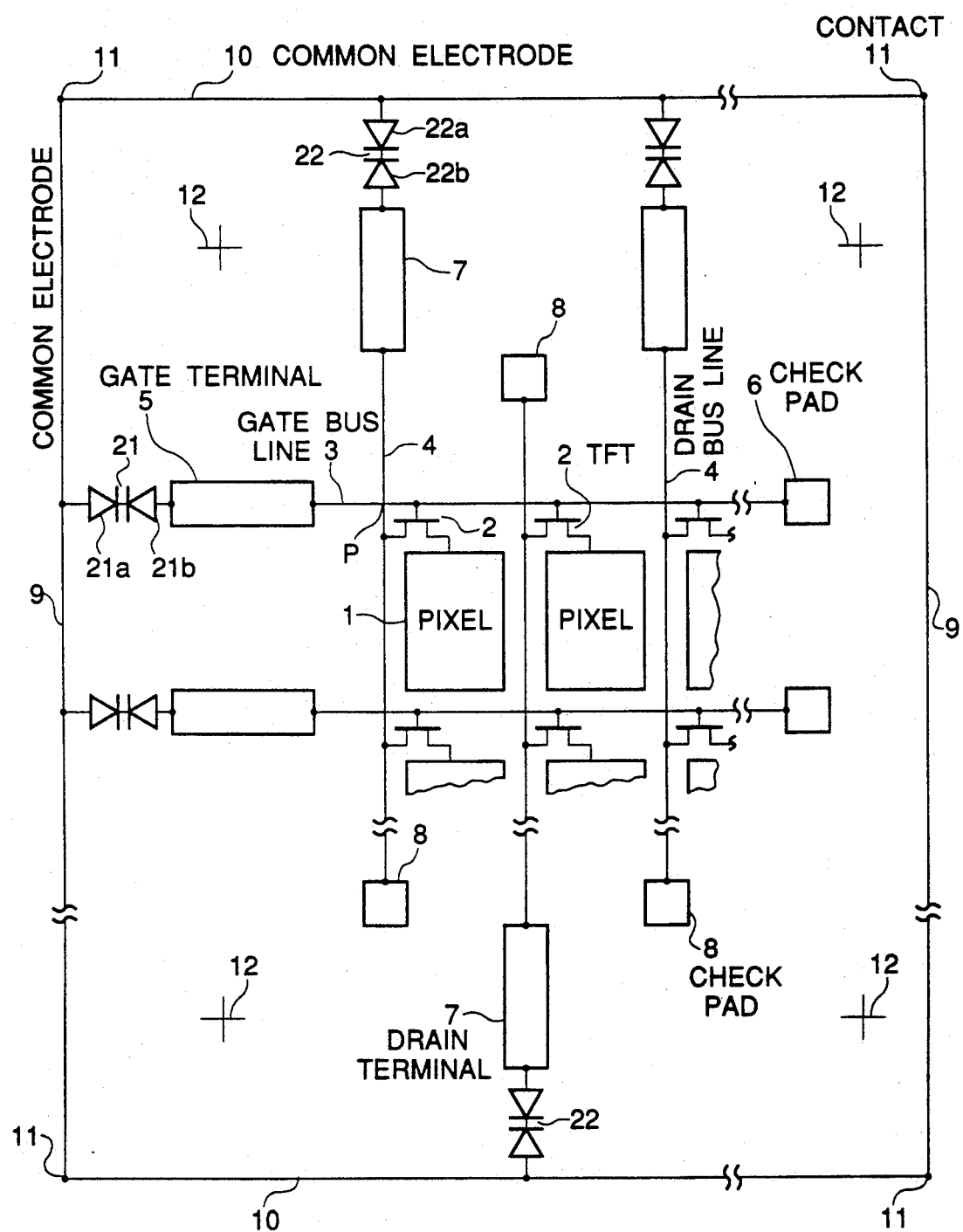
FIG. 2 is a circuit diagram of a first embodiment of the matrix wiring substrate in accordance with the present invention.

Referring to FIG. 2, there is shown a circuit diagram of a first embodiment of the matrix wiring substrate in accordance with the present invention. In FIG. 2, elements corresponding to the those shown in FIG. 1 are given the same Reference Numerals, and explanation thereof will be omitted for simplification of description.

As seen from comparison between FIGS. 1 and 2, the matrix wiring substrate shown in FIG. 2 is featured in that a non-linear resistance element 21 is connected between each gate terminal 5 and the common electrode 9, and a non-linear resistance element 22 is connected between each drain terminal 6 and the common electrode 10. The non-linear resistance element will be abbreviated simply to the "non-linear element" hereinafter.

Each of the non-linear elements 21 and 22 is formed of a pair of series-connected diodes 21a and 21b or 22a and 22b having their cathodes connected to each other. This connection is called a "back-to-back diode". For example, each of these diodes 21a, 21b, 22a and 22b is of a metal Schottky diode formed of an amorphous silicon (a-Si).

Figure 3A:
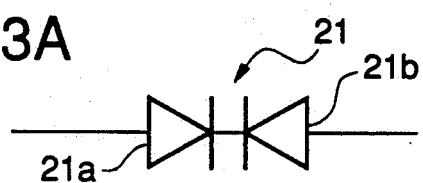
FIGS. 3A, 3B and 3C are an equivalent circuit of the non-linear element connected to the gate terminal in the matrix wiring substrate shown in FIG. 2, a diagrammatic plan view of the non-linear element, and a sectional view taken along the line III—III, respectively.
Figure 3B:
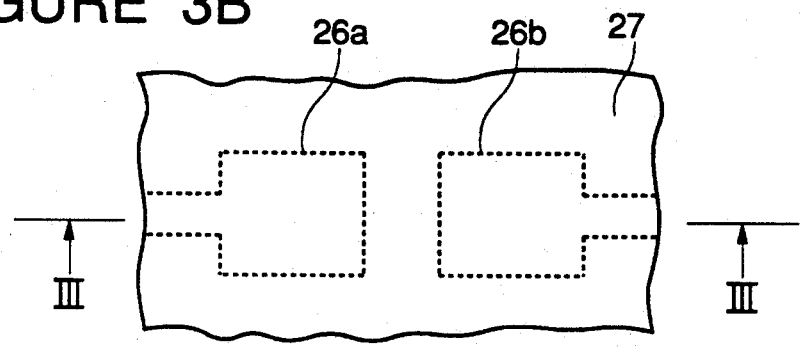
Figure 3C:
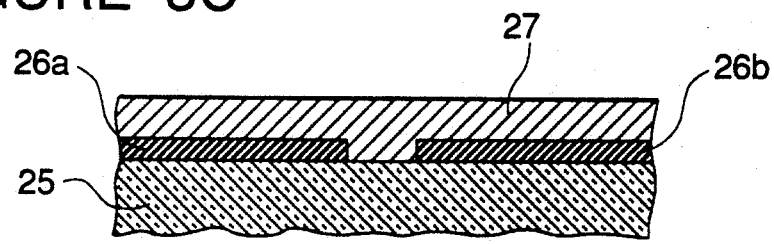

Referring to FIGS. 3A, 3B and 3C, there are shown an equivalent circuit of the non-linear element 21 connected to the gate bus line 3 formed from the lower level wiring, a diagrammatic plan view of the non-linear element 21, and a sectional view taken along the line III—III of the non-linear element 21.

As seen from FIGS. 3A, 3B and 3C, a pair of lower level wirings 26a and 26b are formed on a glass substrate 25, separately from each other so as to leave a predetermined space between the pair of lower level wirings 26a and 26b. The lower level wirings 26a forms anodes of the diodes 21a and 21b, respectively. A non-doped a-Si film 27 is formed on the lower level wirings 26a and 26b. Thus, the non-linear element 21 can be realized in a very simple manner. For example, the lower level wirings 26a and 26b are formed of a metal, such as chromium, Nichrome and titanium, which forms a metal Schottky junction between the a-Si film 27 and the metal.

Figure 4A:
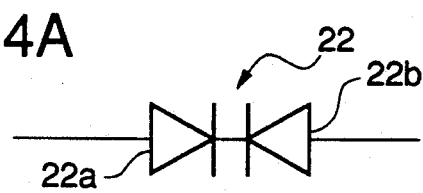
FIGS. 4A, 4B and 4C are an equivalent circuit of the non-linear element connected to the drain terminal in the matrix wiring substrate shown in FIG. 2, a diagrammatic plan view of the non-linear element, and a sectional view taken along the line IV—IV, respectively.
Figure 4B:
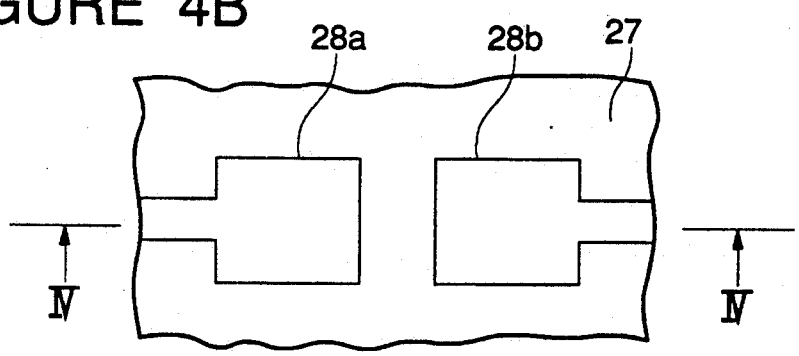
Figure 4C:
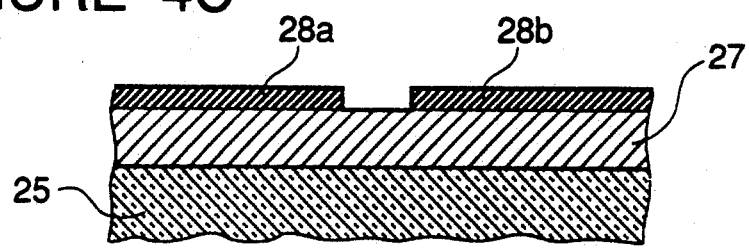

Turning to FIGS. 4A, 4B and 4C, there are shown an equivalent circuit of the non-linear element 22 connected to the drain bus line 4 formed from the upper level wiring, a diagrammatic plan view of the non-linear element 22, and a sectional view taken along the line IV—IV of the non-linear element 22.

As seen from FIGS. 4A, 4B and 4C, the non-doped a-Si film 27 is formed on the glass substrate 25, and a pair of upper level wirings 28a and 28b are formed on the non-doped a-Si film 27, separately from each other so as to leave a predetermined space between the pair of lower level wirings 28a and 28b. The upper level wirings 28a and 28b forms anodes of the diodes 22a and 22b, respectively. Thus, the non-linear element 22 can be realized in a very simple manner. The upper level wirings 28a and 28b are formed of the same material as that of the lower level wirings 26a and 26b.

Figure 5:
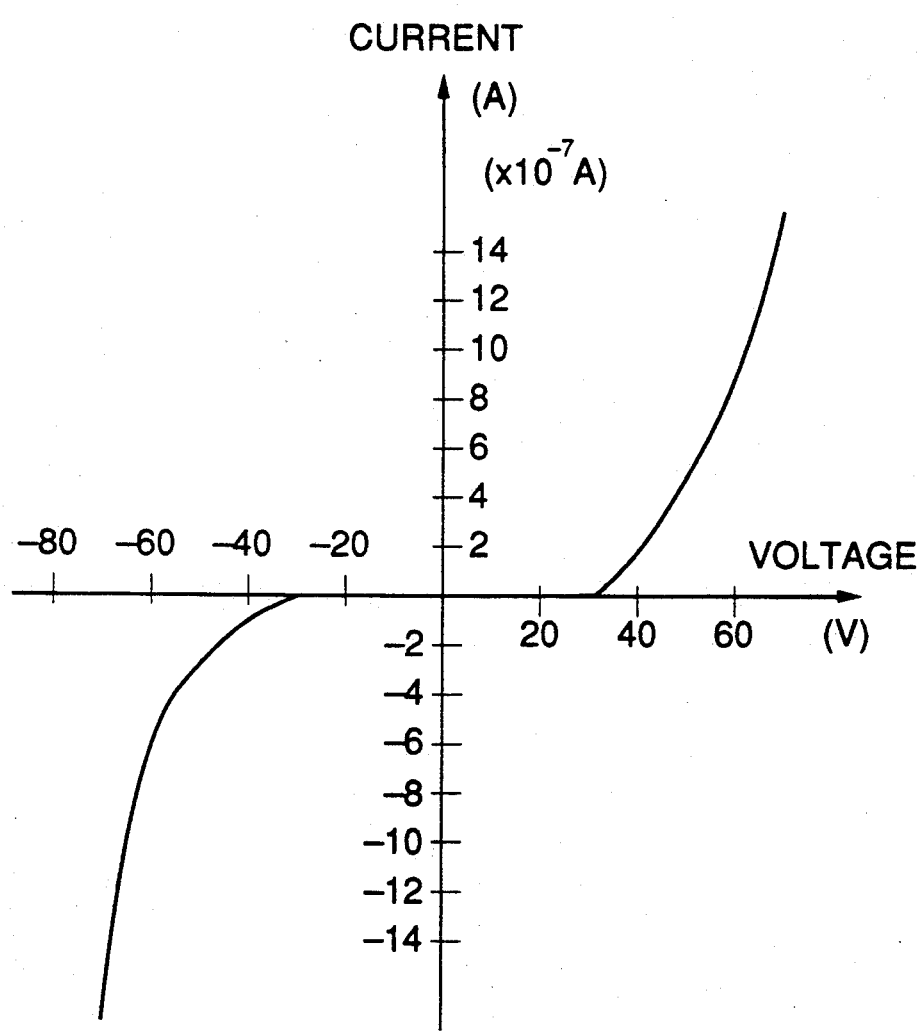
FIG. 5 is a graph showing a voltage-current characteristics of the non-linear element.

An operation of the above mentioned matrix wiring substrate shown in FIG. 2 will be explained in the following:

FIG. 5 is a graph showing a voltage-current characteristics of the non-linear elements 21 and 22. As seen from the graph of FIG. 5, when a voltage applied across the non-linear element is not greater than 30 V, the non-linear element flows almost no electric current. However, if the voltage applied across the non-linear element exceeds 30 V, the current flowing through the non-linear element increases exponentially.

Because of the non-linear resistance characteristics of the non-linear element, a voltage of not greater than 5 V is applied to the checking pad 6, 8 for the purpose of the wiring checking, the non-linear element 21, 22 exhibits a resistance of not less than 10 GΩ. Therefore, a open-/short checking of each wiring can be executed without hindrance. In ordinary cases, a wiring resistance in the liquid crystal display device is on the order of 1KΩ to 50K Ω. Therefore, the resistance of 10 GΩ of the non-linear element added when the wiring checking is carried out is substantially negligible.

On the other hand, an electric voltage induced by generation of static electricity is ordinarily several kilovolts or more. In a working environment provided with static electricity countermeasure, however, the induced voltage can be suppressed to several tens volts. In addition, in view of a breakdown voltage and a thickness of the insulating layers deposited on the glass plate used in the liquid crystal display device, it is required to ensure that a voltage of not less than 100 V is in no way applied to the insulting layers.

In the embodiment of the matrix wiring substrate, it was confirmed that the non-linear element formed of a pair of a-Si diodes had a resistance of not greater than 1 GΩ and could flow an electric current of not less than $6 \times 10^{-8}$ A, when 60 V is applied. In addition, it was also confirmed that, in the working environment provided with static electricity countermeasure, even if a voltage exceeding 100 V is applied to the matrix wiring substrate because of any unexpected abnormality, an electric current flows through the non-linear element 21, 22 to the common electrode 9, 10, so that an insulation breakdown or destruction of the wiring could be prevented.

Figure 6:
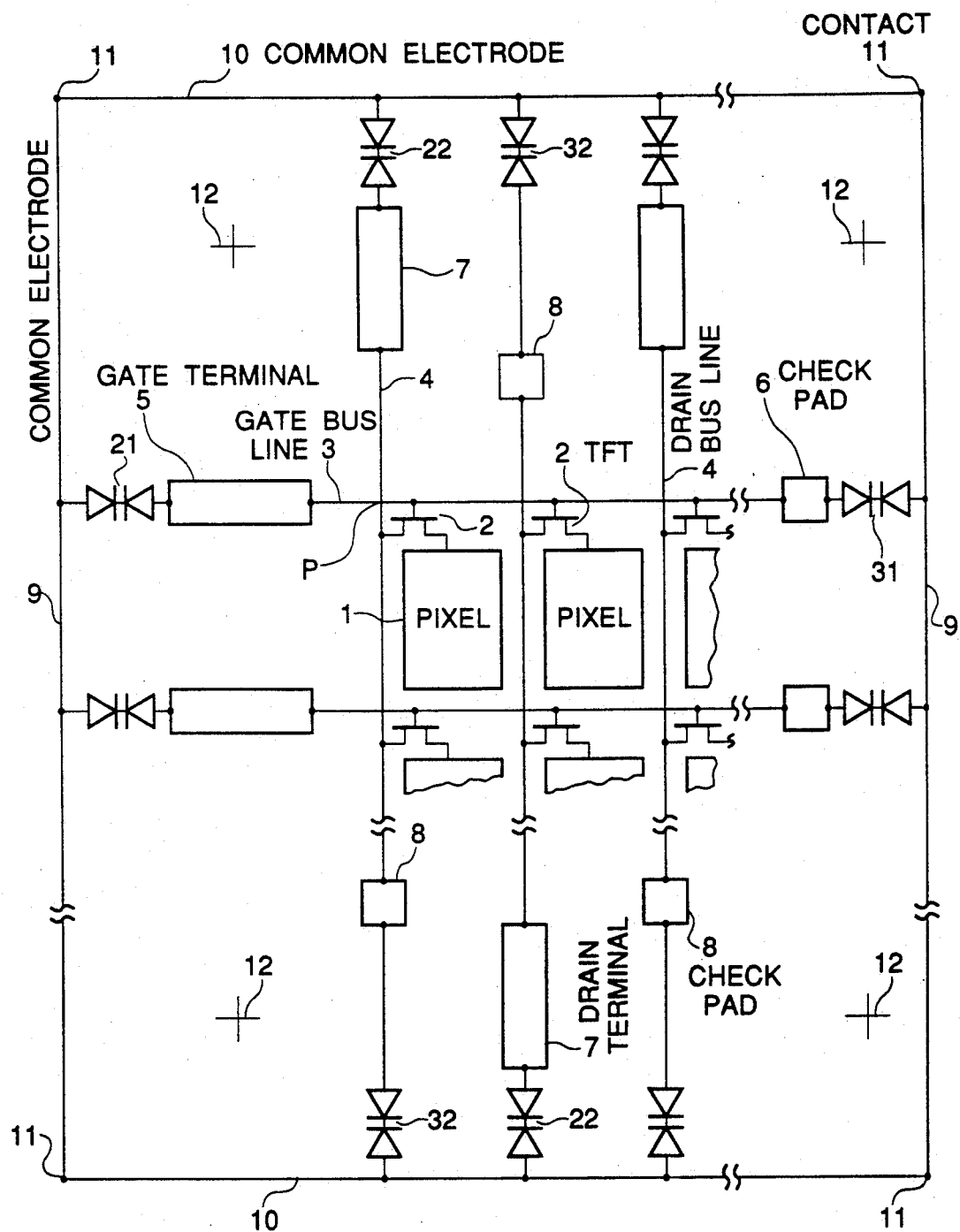
FIG. 6 is a circuit diagram of a second embodiment of the matrix wiring substrate in accordance with the present invention.

Referring to FIG. 6, there is shown a circuit diagram of a second embodiment of the matrix wiring substrate in accordance with the present invention. In FIG. 6, elements corresponding to the those shown in FIG. 2 are given the same Reference Numerals, and explanation thereof will be omitted for simplification of description.

In the second embodiment, not only the non-linear elements 21 and 22 are connected between the gate terminal 5 and the common electrode 9 and between the drain terminal 7 and the common electrode 10, respectively, but also non-linear elements 31 and 32 are connected between the checking pad 6 and the common electrode 9 and between the checking pad 8 and the common electrode 10, respectively.

An end of the gate bus line 3 opposite to the gate terminal 5 and an end of the drain bus line 4 opposite to the drain terminal 7 are connected to the checking pads 6 and 8, respectively. If these checking pads 6 and 8 were connected to the common electrodes 9 and 10, respectively, it is impossible to perform the wiring checking in the prior art. Therefore, the checking pads 6 and 8 were not connected to the common electrodes 9 and 10 in the prior art.

However, in the second embodiment, since the non-linear elements 31 and 32 are connected between the checking pad 6 and the common electrode 9 and between the checking pad 8 and the common electrode 10, respectively, a current can be discharged from opposite ends of each bus line 3 or 4 to the corresponding common electrode 9 or 10 without giving any adverse effect to the wiring checking. Therefore, a further enhanced electrostatic protection can be obtained.

Figure 7:
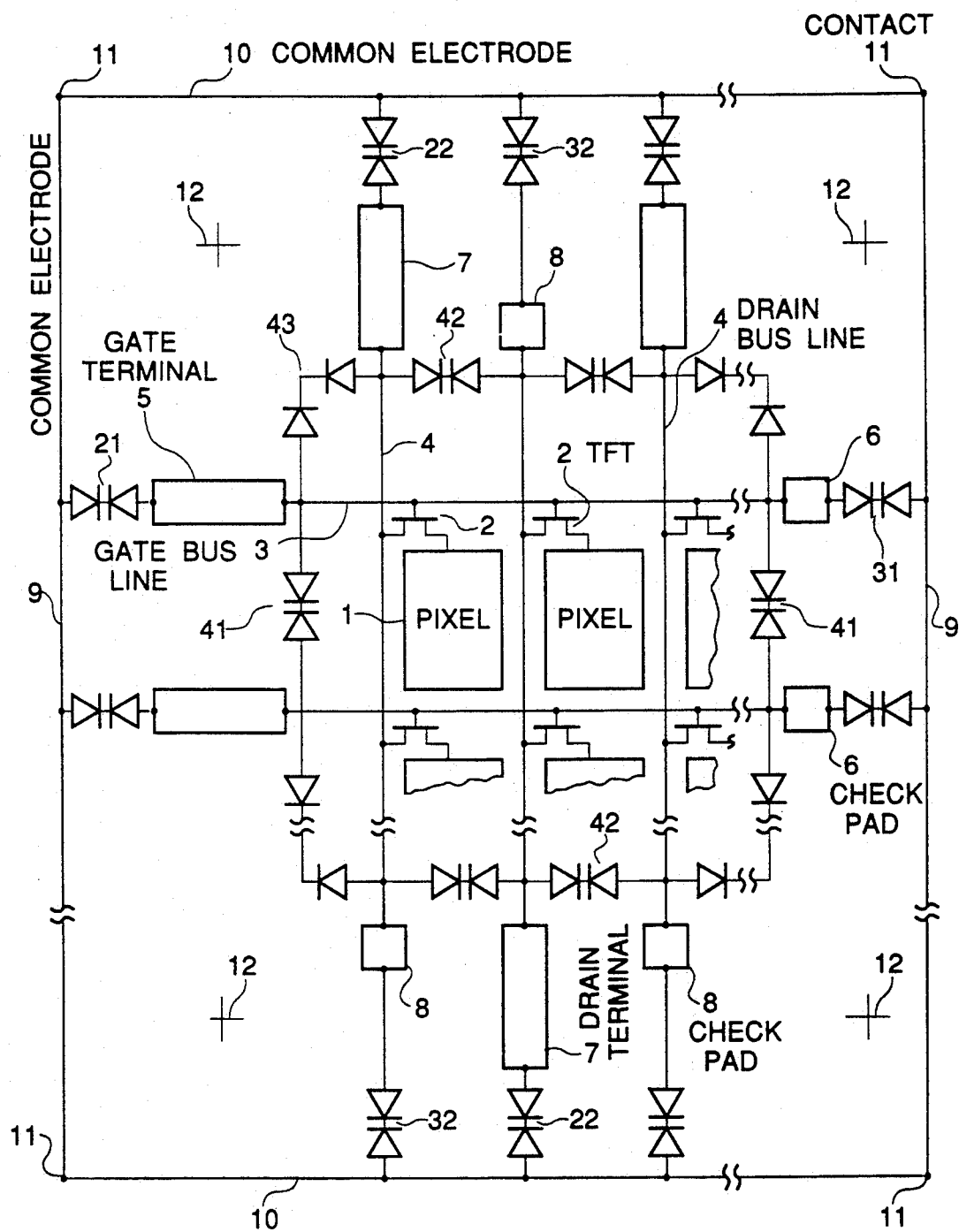
FIG. 7 is a circuit diagram of a third embodiment of the matrix wiring substrate in accordance with the present invention.

Referring to FIG. 7, there is shown a circuit diagram of a third embodiment of the matrix wiring substrate in accordance with the present invention. In FIG. 7, elements corresponding to the those shown in FIG. 6 are given the same Reference Numerals, and explanation thereof will be omitted for simplification of description.

In addition to the non-linear elements 21, 22, 31 and 32 provided in the second embodiment shown FIG. 6, the third embodiment shown FIG. 7 includes a non-linear element 41 connected between each pair of adjacent gate bus lines 3, a non-linear element 42 connected between each pair of adjacent drain bus lines 4, and a non-linear element 43 connected between the gate bus line 3 and the drain bus line 4 at each of four corners of the matrix.

Figure 8A:
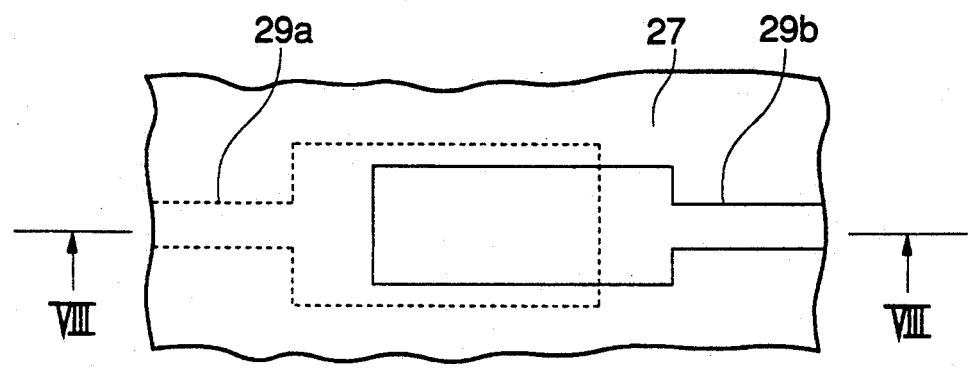
FIGS. 8A and 8B are a diagrammatic plan view of the non-linear element located at a matrix corner in the matrix wiring substrate shown in FIG. 7, and a sectional view taken along the line VIII—VIII, respectively.
Figure 8B:
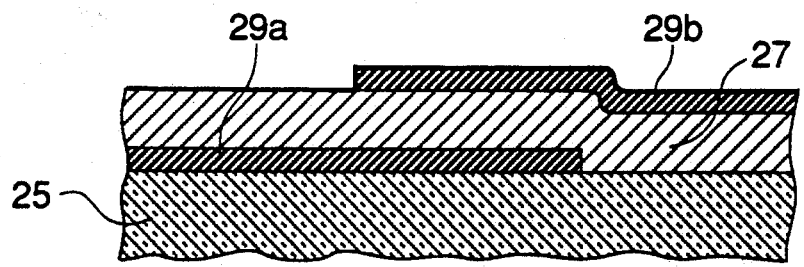

The non-linear elements 41 and 42 are formed similarly to the non-linear elements 21 and 22, respectively. On the other hand, the non-linear element 43 can be formed as shown in FIGS. 8A and 8B. FIG. 8A is a diagrammatic plan view of the non-linear element 43, and FIG. 8B is a sectional view taken along the line VIII—VIII.

As shown in these figures, the non-linear element 43 is formed such that a lower level wiring 29a extending from the gate bus line 3 is formed on the glass substrate 25, and the non-doped a-Si film 27 is deposited on the lower level wiring 29a and on the glass substrate 25, and also, an upper level wiring 29b extending from the drain bus line 4 is formed on the non-doped a-Si film 27 so as to partially overlap the lower level wiring 29a. The lower and upper level wirings 29a and 29b can be formed of a metal that forms a metal Schottky junction between the a-Si film 27 and the metal.

In the third embodiment shown in FIG. 7, all of the bus lines 3 and the drain lines 4 are connected to form a loop through the intermediary of the non-linear elements 41, 42 and 43. Therefore, even after the matrix wiring substrate is cut along an imaginary line connecting the cut marks 12 in a late step of the liquid crystal display device manufacturing process so that the terminals and pads 5 to 8 are disconnected from the common electrodes 9 and 10, an electrostatic breakdown or destruction which would occur in the succeeding steps can be effectively prevented by a looped current path formed of the non-linear elements 41, 42 and 43. On the other hand, the looped current path formed of the non-linear elements 41, 42 and 43 will give no adverse electrical affect to the wiring checking and the liquid crystal display operation, because of the function of the non-linear elements 41, 42 and 43.

Figure 9:
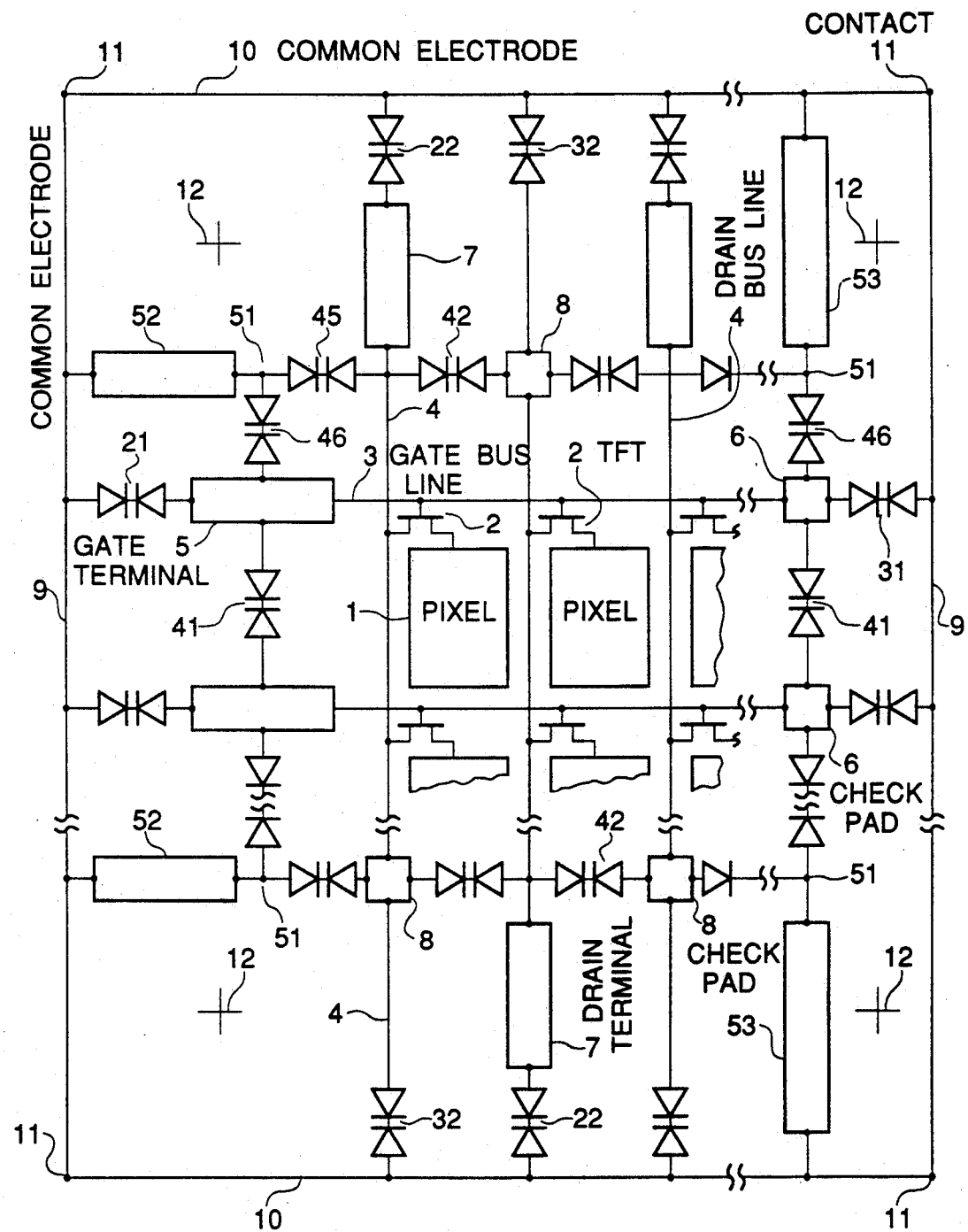
FIG. 9 is a circuit diagram of a fourth embodiment of the matrix wiring substrate in accordance with the present invention.

Referring to FIG. 9 is a circuit diagram of a fourth embodiment of the matrix wiring substrate in accordance with the present invention. In FIG. 9, elements corresponding to the those shown in FIG. 7 are given the same Reference Numerals, and explanation thereof will be omitted for simplification of description.

In the fourth embodiment, each non-linear element connecting between the gate bus line 3 and the drain bus line 4 at each corner of the matrix is constituted of two non-linear elements 45 and 46, which are connected by a through-hole contact 51 interconnecting between the upper and lower level wirings. The contact 51 is used as an electrostatic protection terminal lead-out, and an electrostatic protection terminal 52 or 53 is connected between the electrostatic protection terminal lead-out contact 51 and a corresponding common electrode 9 or 10. These electrostatic protection terminal 52 or 53 are located to intersect an imaginary line connecting the cut marks 12

In the shown fourth embodiment, since the electrostatic protection terminals 52 and 53 are provided, after the common electrodes 9 and 10 are cut away, when the liquid crystal display device is assembled with a module drive circuit, the matrix wiring substrate can be grounded through the electrostatic protection terminals 52 and 53 to an external circuit. Accordingly, a further improved electrostatic protection function can be given.

Figure 10:
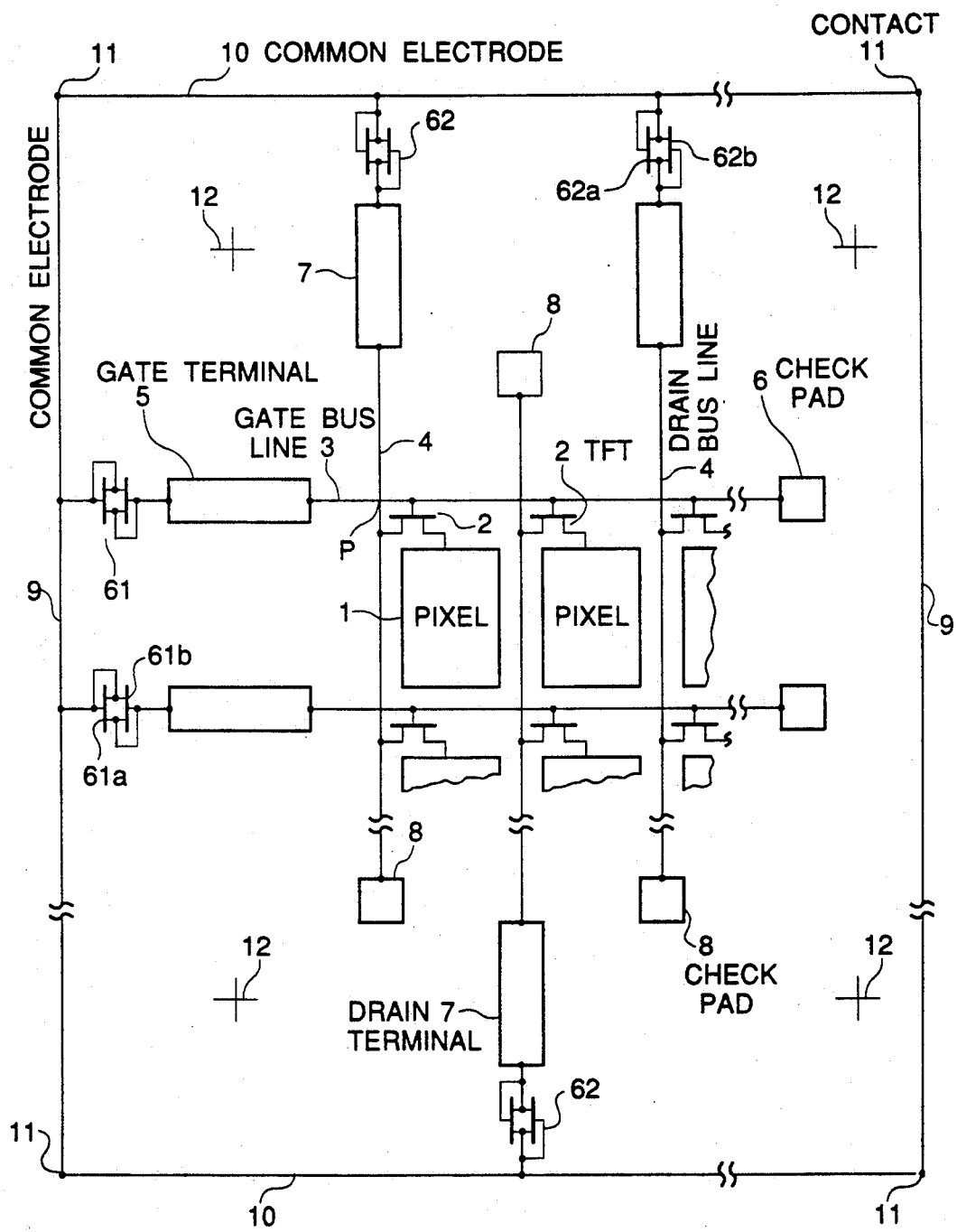
FIG. 10 is a circuit diagram of a fifth embodiment of the matrix wiring substrate in accordance with the present invention.

Referring to FIG. 10, there is shown a circuit diagram of a fifth embodiment of the matrix wiring substrate in accordance with the present invention. In FIG. 10, elements corresponding to the those shown in FIG. 2 are given the same Reference Numerals, and explanation thereof will be omitted for simplification of description.

As seen from comparison between FIGS. 2 and 10, the fifth embodiment includes a non-linear element 61 or 62 composed of pair of FETs (field effect transistors) such as TFTs, instead of the non-linear element 21 or 22 composed of the back-to-back diode.

The non-linear element 61 is composed of a pair of TFTs 61a and 61b connected in such a manner that a source and a drain of the TFT 61a having its gate and its drain short-circuited to each other are respectively connected to a drain and a source of the TFT 61b having its gate and its drain short-circuited to each other. In addition, the non-linear element 62 is composed of a pair of TFTs 62a and 62b connected in a similar manner. These TFTs 61a, 61b, 62a and 62b can be formed of a-Si which forms each TFT 2 of the matrix.

Figure 11A:
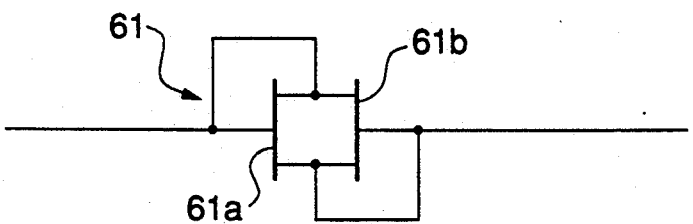
FIGS. 11A, 11B and 11C are an equivalent circuit of the non-linear element connected to the gate terminal in the matrix wiring substrate shown in FIG. 10, a diagrammatic plan view of the non-linear element, and a sectional view taken along the line XI—XI, respectively.
Figure 11B:
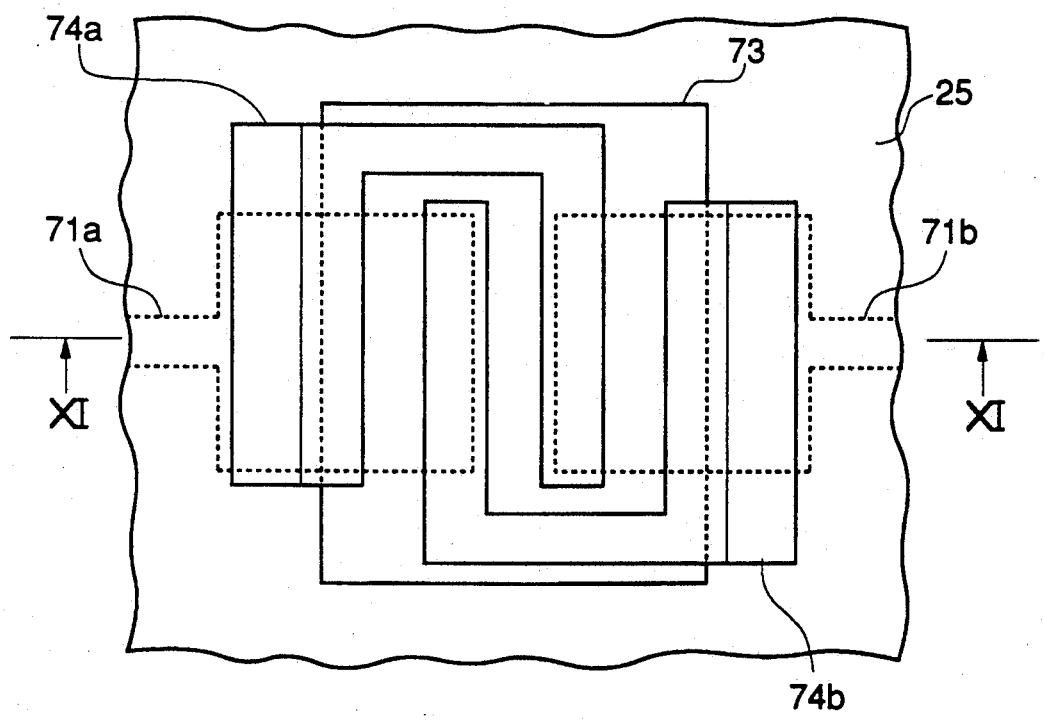
Figure 11C:
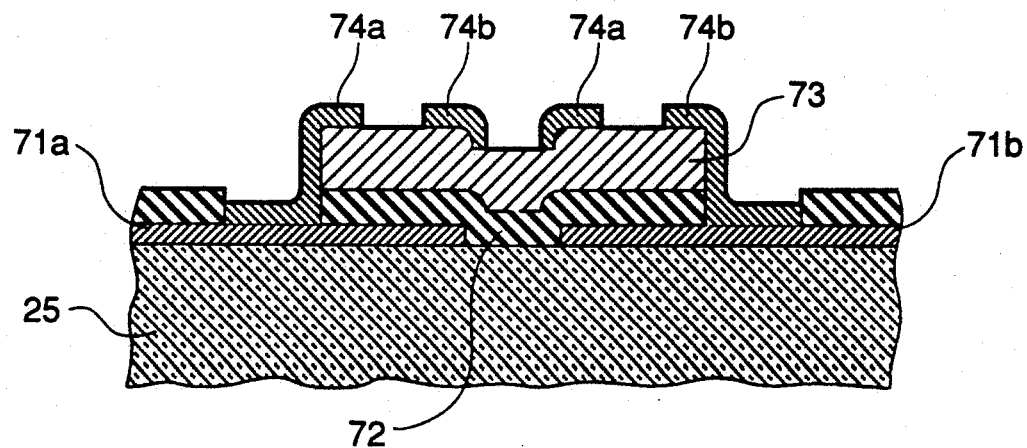

Turning to FIGS. 11A, 11B and 11C, there are shown an equivalent circuit of the non-linear element 61 connected to gate bus line 3 formed from the lower level wiring, a diagrammatic plan view of the of the non-linear element 61, and a sectional view taken along the line XI—XI of the non-linear element 61.

The shown non-linear element 61 includes a pair of gate electrodes 71a and 71b formed from the lower level wiring and located on the glass substrate 25 separately from each other so as to leave a predetermined space between the gate electrodes 71a and 71b. On these gate electrodes 71a and 71b, a gate insulator 72 and an a-Si film 73 are deposited in the named order, and contact holes reaching the gate electrodes 71a and 71b, respectively, are formed in the gate insulator 72. A pair of source-and-drain electrodes 74a and 74b in a U-shape are formed on the a-Si film 73 in such a manner that an end of the source-and-drain electrodes 74a and 74b are contacted to the gate electrodes 71a and 71b, respectively.

Figure 12A:
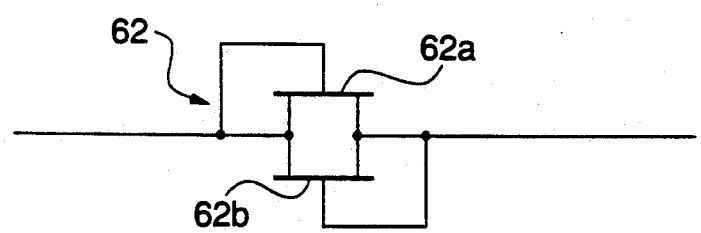
FIGS. 12A, 12B and 12C are an equivalent circuit of the non-linear element connected to the drain terminal in the matrix wiring substrate shown in FIG. 10, a diagrammatic plan view of the non-linear element, and a sectional view taken along the line XII—XII, respectively.
Figure 12B:
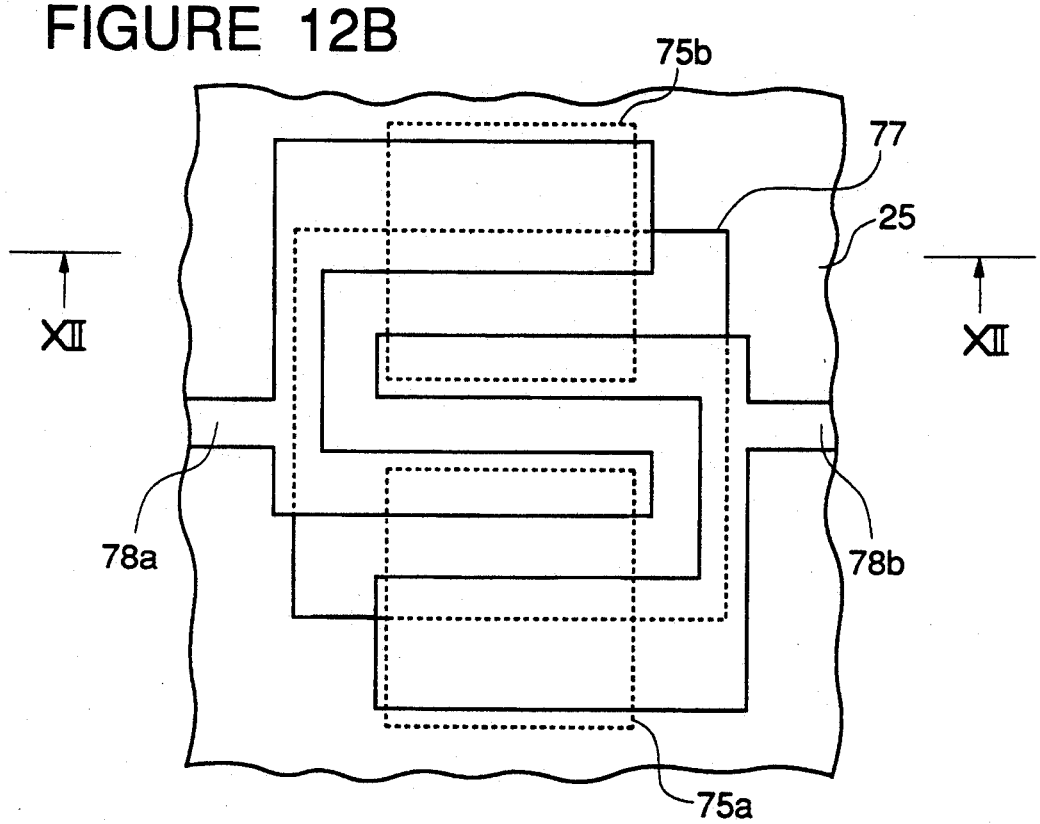
Figure 12C:
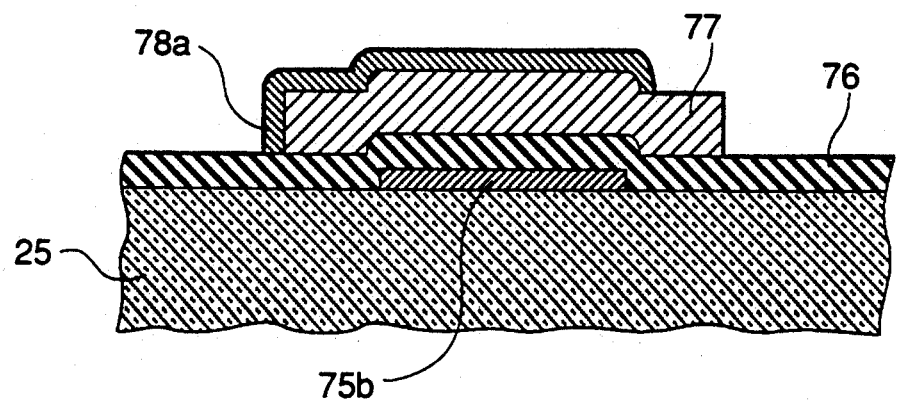

Referring to FIGS. 12A, 12B and 12C, there are shown an equivalent circuit of the non-linear element 62 connected to the drain bus line 4 formed from the upper level wiring, a diagrammatic plan view of the non-linear element 62, and a sectional view taken along the line XII—XII of the non-linear element 62.

The shown non-linear element 62 includes a pair of gate electrodes 75a and 75b formed from the lower level wiring and located on the glass substrate 25 separately from each other so as to leave a predetermined space between the gate electrodes 75a and 75b. On these gate electrodes 75a and 75b, a gate insulator 76 and an a-Si film 77 are deposited in the named order, and contact holes reaching the gate electrodes 75a and 75b, respectively, are formed in the gate insulator 72. A pair of source-and-drain electrodes 78a and 78b of a U-shape connected to the upper level wiring are formed on the a-Si film 77 in such a manner that an end of the source-and-drain electrodes 78a and 78b are contacted to the gate electrodes 75a and 75b, respectively.

Figure 13:
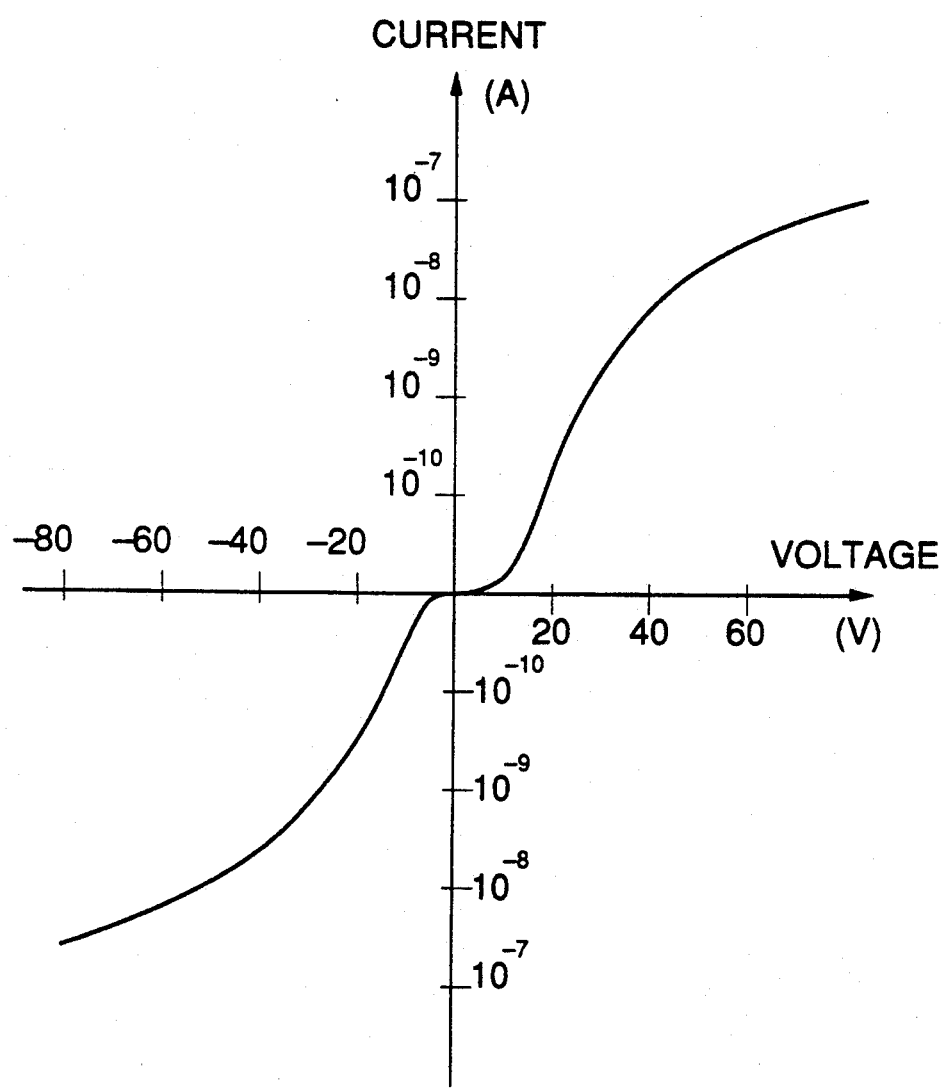
FIG. 13 is a graph showing a voltage-current characteristics of the non-linear element shown in FIGS. 12 and 13.

FIG. 13 is a graph showing a voltage-current characteristics of the non-linear elements 61 and 62 composed of a pair of TFTs. As seen from the graph of FIG. 11, when a voltage applied across the non-linear element is not greater than 30 V, the non-linear element flows only an electric current of not greater than $10^{-9}$ A and has a resistance of not less than 1 G$\Omega$. On the other hand, if the voltage applied across the non-linear element exceeds 60 V, the current flowing through the non-linear element becomes not less than $10^{-8}$ A and the resistance of the non-linear element becomes 100M$\Omega$ or less.

In this embodiment, accordingly, the resistance of the non-linear element 61, 62 at the time of the wiring checking is greatly larger than the wiring resistance. Therefore, the resistance of the non-linear element 61, 62 is substantially negligible at the time of the wiring checking. Namely, a open/short checking of each wiring can be executed without hindrance. On the other hand, when a high electric voltage is induced by generation of static electricity, since the resistance of the non-linear element 61, 62 becomes a negligible small value, the electrostatic protection can be ensured.

Figure 14:
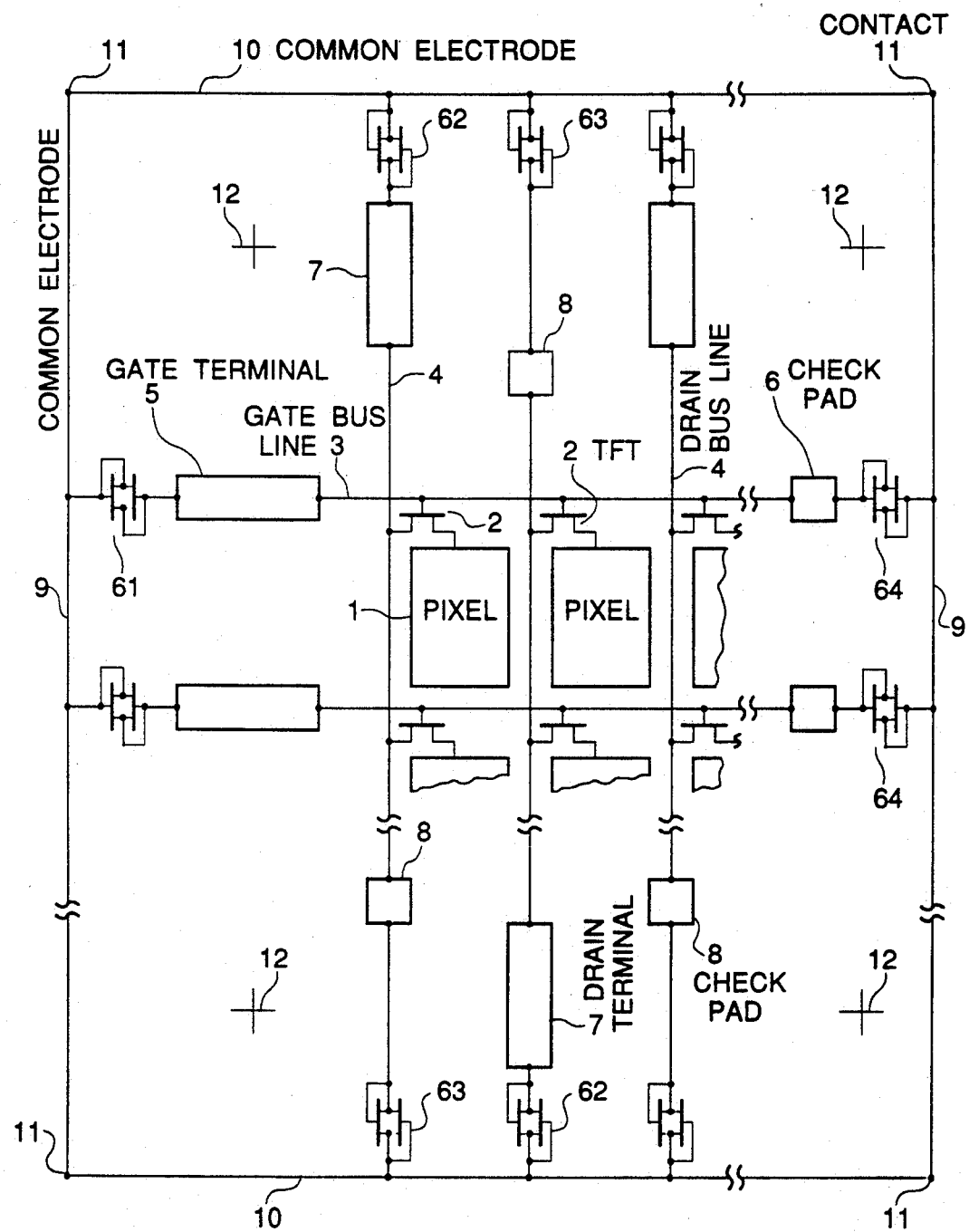
FIG. 14 is a circuit diagram of a sixth embodiment of the matrix wiring substrate in accordance with the present invention.

Referring to FIG. 14, there is shown a circuit diagram of a sixth embodiment of the matrix wiring substrate in accordance with the present invention. In FIG. 14, elements corresponding to the those shown in FIG. 6 are given the same Reference Numerals, and explanation thereof will be omitted for simplification of description.

In the sixth embodiment shown in FIG. 14, non-linear elements 61, 62, 63 and 64 each formed of a pair of TFTs are provided in place of the non-linear elements 21, 22, 23 and 24 in the second embodiment shown in FIG. 6, respectively.

As seen from the above, the non-linear elements can be formed of a combination of two three-terminal elements, by connecting a gate of a TFT to a drain or source of the TFT for example. This non-linear element can be similarly applied to the third and fourth embodiments.

Thus, the matrix wiring substrate in accordance with the present invention makes it possible to properly perform the wiring checking and at the same time to give a sufficient protection for static electricity, so that the yield of product can be remarkably improved.

The invention has thus been shown and described with reference to the specific embodiments. However, it should be noted that the present invention is in no way limited to the details of the illustrated structures but changes and modifications may be made within the scope of the appended claims.

I claim:

1. A matrix wiring substrate comprising an insulating substrate, a plurality of first level wirings provided on said insulating substrate, a plurality of second level wirings provided on said insulating substrate to intersect said first level wirings, an insulating layer provided between said first and second level wirings at least at a region where said first and second level wirings intersect each other, a common electrode connected in common to said first and second level wirings for preventing an electrostatic destruction of said insulating layer, said common electrode being located to extend along a periphery of said insulating substrate and to surround said first and second level wirings, a non-linear resistance means connected between each end of each of said first and second level wirings and said common electrode in such a manner that one end of each of said first and second level wirings is connected to said common electrode through an associated terminal and said non-linear resistance means in the named order, said non-linear resistance means being positioned at an outside of said associated terminal, said non-linear resistance means having a resistance non-linearly decreasing with an increase of an absolute value of a voltage applied across said non-linear resistance means, and checking pads each of which is connected to the other end of a corresponding one of said first and second level wirings, said non-linear resistance means being positioned outside of said checking pads.

2. A matrix wiring substrate claimed in claim 1 wherein said non-linear resistance means has a resistance not less than 1 GΩ when the voltage applied across said non-linear resistance means is not greater than 30 V, and has a resistance less than 1 GΩ when the voltage applied across said non-linear resistance means is not less than 60 V.

3. A matrix wiring substrate claimed in claim 1 wherein said non-linear resistance means includes a pair of diodes series-connected in such a manner that cathodes of the pair of diodes are connected to each other.

4. A matrix wiring substrate claimed in claim 3 wherein said pair of diodes are formed by a semiconductor layer and a pair of conductors formed in contact with said semiconductor layer and separated from each other, said pair of conductors being formed of a metal which forms a Schottky junction between said semiconductor layer and each of said pair of conductors.

5. A matrix wiring substrate claimed in claim 1 wherein said non-linear resistance means includes a pair of field effect transistors connected in such a manner that a gate and a drain of each of the field effect transistors are connected to each other, and the drain and a source of one of the field effect transistors are connected to a source and the drain of the other of the field effect transistors, respectively.

6. A matrix wiring substrate claimed in claim 1 further including a non-linear resistance means connected between said first and second level wirings, a non-linear resistance means connected between said first level wirings, and a non-linear resistance means connected between said second level wirings.

7. A matrix wiring substrate claimed in claim 6 wherein said non-linear resistance means has a resistance not less than 1 GΩ when the voltage applied across said non-linear resistance means is not greater than 30 V, and has a resistance less than 1 GΩ when the voltage applied across said non-linear resistance means is not less than 60 V.

8. An active matrix liquid crystal display comprising an insulating substrate, a number of pixel electrodes arranged in the form of a matrix on said insulating substrate, each of said pixel electrodes being associated with one switching means for individually driving the corresponding pixel electrode, a plurality of row lines formed from a first level conductor on said insulating substrate, each of said row lines extending along a corresponding row of the matrix, the switching means included in each one row being connected to a corresponding row line, a plurality of column lines formed from a second level conductor on said insulating substrate, each of said column lines extending along a corresponding column of the matrix and intersecting said plurality of row lines, the switching means included in each one column being connected to a corresponding column line, an insulating layer provided between said first and second level conductors for insulating said first and second level conductors from each other, a common electrode connected in common to said row lines and said column lines for preventing an electrostatic destruction of said insulating layer, said common electrode being located to extend along a periphery of said insulating substrate and to surround said row lines and said column lines, and a non-linear resistance means connected between said common electrode and each end of each of said row lines and said column lines in such a manner that one end of each of said row lines and said column lines is connected to said common electrode through an associated terminal and said non-linear resistance means in the named order, said non-linear resistance means being positioned at an outside of said associated terminal, said non-linear resistance means having a resistance non-linearly decreasing with an increase in an absolute value of a voltage applied across said non-linear resistance means, and checking pads each of which is connected to the other end of a corresponding one of said row lines and said column lines, said non-linear resistance means being positioned at an outside of said checking pads.

9. An active matrix claimed in claim 8 wherein said non-linear resistance means includes a pair of diodes series-connected in such a manner that cathodes of the pair of diodes are connected to each other.

10. An active matrix claimed in claim 9 wherein said pair of diodes are formed by a semiconductor layer and a pair of conductors formed in contact with said semiconductor layer and separated from each other, said pair of conductors being formed of a metal which forms a Schottky junction between said semiconductor layer and each of said pair of conductors.

11. An active matrix claimed in claim 8 wherein said non-linear resistance means includes a pair of field effect transistors connected in such a manner that a gate and a drain of each of the field effect transistors are connected to each other, and the drain and a source of one of the field effect transistors are connected to a source and the drain of the other of the field effect transistors, respectively.

12. An active matrix claimed in claim 8 further including a non-linear resistance means connected between said row line and said column line at each corner of the matrix, a non-linear resistance means connected between each pair of adjacent row lines, and a non-linear resistance means connected between each pair of adjacent column lines.

* * * * *